US011314620B1

(12) United States Patent
Lin et al.

(10) Patent No.: US 11,314,620 B1
(45) Date of Patent: Apr. 26, 2022

(54) METHODS AND SYSTEMS FOR INTEGRATING MODEL DEVELOPMENT CONTROL SYSTEMS AND MODEL VALIDATION PLATFORMS

(71) Applicant: Capital One Services, LLC, McLean, VA (US)

(72) Inventors: Yu Lin, McLean, VA (US); Qian Shen, McLean, VA (US); Zhenyu Liu, McLean, VA (US); Kai Zhang, McLean, VA (US); Kangning Li, McLean, VA (US); Yanni Ding, McLean, VA (US); Jie Tang, McLean, VA (US); Piero Monteverde, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/116,572

(22) Filed: Dec. 9, 2020

(51) Int. Cl.
*G06F 11/36* (2006.01)
*G06F 3/14* (2006.01)
*G06F 8/35* (2018.01)
*G06N 5/04* (2006.01)

(52) U.S. Cl.
CPC ............ *G06F 11/3608* (2013.01); *G06F 3/14* (2013.01); *G06F 8/35* (2013.01); *G06N 5/04* (2013.01)

(58) Field of Classification Search
CPC ..................................................... G06F 11/36
See application file for complete search history.

(56) References Cited

U.S. PATENT DOCUMENTS

| | | | |
|---|---|---|---|
| 2003/0144953 A1* | 7/2003 | Razum | G06Q 20/102 705/40 |
| 2005/0114809 A1* | 5/2005 | Lu | G06F 30/3323 716/103 |
| 2010/0241408 A1* | 9/2010 | Ditlinger | G06Q 10/06375 703/6 |
| 2016/0055589 A1* | 2/2016 | Billings | G06Q 40/08 705/4 |

* cited by examiner

*Primary Examiner* — Jae U Jeon
(74) *Attorney, Agent, or Firm* — Perkins Coie LLP

(57) ABSTRACT

Methods and systems are described herein for integrating model development control systems and model validation platforms. For example, the methods and systems discussed herein recite the creation and use of a model validation platform. This platform operates outside of the environment of the independently validated models as well as the native platform into which the independently validated models may be incorporated. The model validation platform may itself include a model that systematically validates other independently validated models. The model validation platform may then provide users substantive analysis of a model and its performance through one or more user interface tools such as side-by-side comparisons, recommended adjustments, and/or a plurality of adjustable model attributes for use in validating an inputted model.

20 Claims, 6 Drawing Sheets

200

| Least Squares Regression | Logistic Regression | Time Series | |
|---|---|---|---|
| Data Analysis - Quality Check | Data Analysis - Code Review | Outcome Analysis - Model Goodness of Fit | Outcome A Residual A |

| Code Review | Code Execution | Code Editing |
|---|---|---|
| Code Source<br>◉ MD code Submission<br>◉ MVG Alternative Code Input<br><br>[ Submit ] | | union<br><br>    select flow_end_dt, sum(bal_move_amt) as CD_to_liq_bal, 'MMA' as prod_to from<br>BARC_DB_COLLAB.LAB_BPMF.jma498_ing_mthly_funds_flow_sf<br>    where prod_from='OCD' and prod_to in ('SP2', 'SPT2')<br>    group by flow_end_dt<br><br>    order by flow_end_dt, prod_to;<br>select acct_id, snap_dt, open_dt, acct_stat_cd, gl_prod_styp_cd, acct_ldgr_bal, mturt_dt, term_txt<br>    from DB.pdbdw.pf_dep_acct_pt<br>    where acct_stat_cd not in (4,5)/*and cust_rlatnp_type_cd='A'/ and prod_type_cd=3500/*and snap_dt>='2012-12-28'/*and snap_dt<'2019-04-10'*/ and mturt_dt=snap_dt+2 /*and (term_txt like '12M%' or term_txt like '24M%' or term_txt like '60M%')*/<br>    order by snap_dt<br>select * from BARC_DC_COLLAB.LAB_BPMF.JMA498_DEPOSIT_RATE_360<br>    where START_DT > '2000-01-01'<br>    and PRODUCT in ('360_MMA_T1','360_MMA_T2','Saving','OCD_12')<br>    order by PRODUCT, START_DT;<br>select<br>ECON_IND_RPTD_ME_DT,YYMM_NUM,ECON_IND_MNEM_CD,ECON_REGN_CD,ECOND_IND_VAL from DB.pedw.mdy_econ_ind_mthly_regn where ECON_IND_MNEM_CD in ('FLBR', 'FYPDPI$Q','FRFED') and econ_regn_cd like 'IUSA' and yymm_num=201904<br>    order by ECON_IND_MNEM_CD,ECON_IND_RPTD_ME_DT |
| | | [ Run Code ] |

FIG. 2

METHODS AND SYSTEMS FOR INTEGRATING MODEL DEVELOPMENT CONTROL SYSTEMS AND MODEL VALIDATION PLATFORMS

FIELD OF THE INVENTION

The invention relates to integrating model development control systems and model validation platforms.

BACKGROUND

Model programming and software programming projects are typically team-based and involve multiple team members working together to produce a given project (e.g., a software application). To facilitate this team activity, team members may submit contributions to the project to a distributed version control system. In some programming projects (e.g., those that include large platforms), individual contributions may include one or more computer models (e.g., a computer program that is designed to simulate what might or what did happen in a situation). In each case, a model may need to be validated (i.e., confirmed to be accurate such that the outputs of the model are statistically acceptable). However, as the contributors of the model are the entities performing the validation, any issues resulting from the model and/or undetected in the validation may infect the entire platform.

SUMMARY

Methods and systems are described herein for integrating model development control systems and model validation platforms. For example, as discussed above, conventional model validation systems rely on the model development team that generated a model to also validate the model prior to incorporating the model into the larger platform. This, however, may create issues as any errors undetected by the team during generation may likewise go undetected during validation. These errors may then lead to increased risk that a model will fail. Moreover, these errors and issues may not be detected until the model is already incorporated into the larger platform thus creating the potential for platform-wide failure.

Unfortunately, conventional model development tools are unable to assist with this problem as these tools rely on conventional issue management and bug tracking tools. While these tools may excel at detecting errors in source code and organizing workflows between team members, these tools are not equipped to detect issues in model validation, because model validation often relies on complex algorithms, the use of specific data sets, individual techniques of preparing data and/or training the models. All of these factors, including the combination as a whole, may be unique to each model.

To overcome these technical challenges, the methods and systems discussed herein recite the creation and use of a model validation platform. This platform operates outside of the environment of the independently validated models as well as the native platform into which the independently validated models may be incorporated into. The model validation platform may itself include a model that systematically validates other independently validated models. For example, the model validation platform may generate a benchmark model based on the dataset of the model being validated. The model validation platform may then compare the benchmark model and the model being validated. The model validation platform may then provide users substantive analysis of a model and its performance through one or more user interface tools such as side-by-side comparisons, recommended adjustments, and/or a plurality of adjustable model attributes for use in validating an inputted model.

Moreover, to overcome the technical challenges discussed above, the methods and systems recite a specific platform architecture that allows the platform to accommodate the complex algorithms, the use of specific data sets, individual techniques of preparing data, and/or training the models. For example, the model validation platform includes a hierarchy of tasks for validating inputted models. The model validation platform may then iterate through the hierarchy of tasks along task branches that may be either automatically selected or selected based on user inputs. For example, the model validation platform may provide an initial assessment of an inputted model's validity, but also allow a user of the model validation platform to select one or more model attributes (e.g., data preparation techniques, algorithms, validation metrics, etc.) for applying to the inputted model. Based on traversing the hierarchy of tasks, the system may accumulate enough information to provide native data for the first model and the second model (e.g., predicted values, trends, graphs, plots, etc.) and assessment data that describes, in a human-readable format, a relationship between the native data for the first model and the second model in response to a user selection of the model validation assessment (e.g., how the results of the first model and second model compare) as well as recommendations for improvements to the model. Furthermore, due to the unique architecture of the model validation platform, the model validation platform is not only able to detect model risk, but is also scalable and may generate dynamic reports that provide outcome analysis, and alternative modeling recommendations, while operating in a cloud-based environment.

In one aspect, systems and methods are described for integrating model development control systems and model validation platforms. For example, the system may receive a user request to access a model validation assessment for a model validation platform, wherein the model validation assessment defines an integrated hierarchy of tasks for the model validation platform. The system may retrieve a first model for a model validation platform, wherein the first model defines a first hierarchy of tasks for validating inputted models. The system may retrieve a second model that has been independently validated, wherein the second model defines a second hierarchy of tasks for simulating scenarios based on a second model data input and a second model attribute. The system may generate the model validation assessment based on the first model and the second model, wherein the model validation assessment indicates a performance level of the second model. The system may receive a user selection of the model validation assessment. The system may, in response to the user selection of the model validation assessment, generate for display native data for the first model and the second model, and assessment data that describes, in a human-readable format, a relationship between the native data for the first model and the second model.

Various other aspects, features and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 shows another illustrative user interface for a model validation platform, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known models and devices are shown in block diagram form in order to avoid unnecessarily obscuring the embodiments of the invention. It should also be noted that the methods and systems disclosed herein are also suitable for applications unrelated to source code programming.

Figure 1:
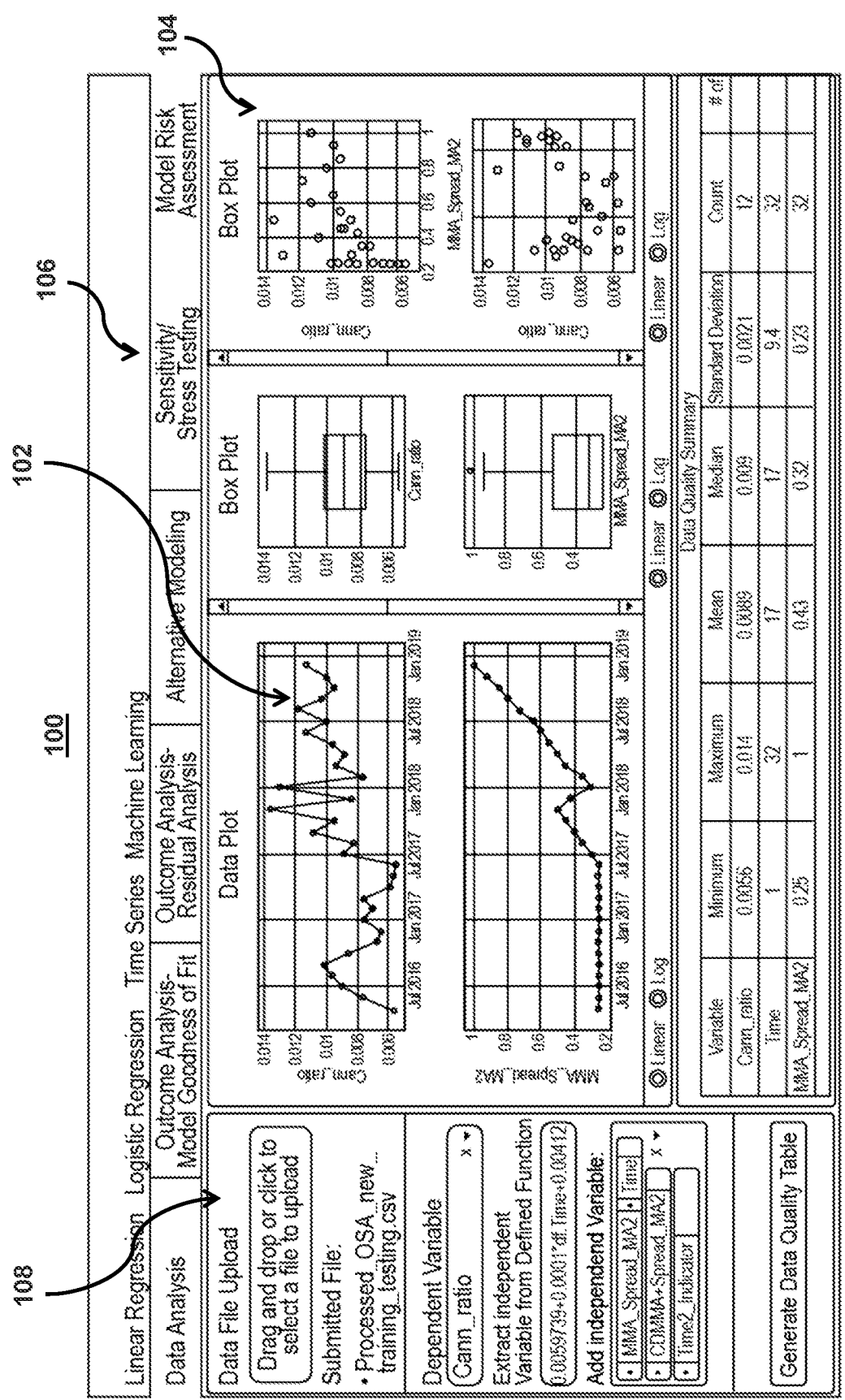
FIG. 1 shows an illustrative user interface for a model validation platform, in accordance with one or more embodiments.

FIG. 1 shows an illustrative user interface for a model validation platform, in accordance with one or more embodiments. For example, the system and methods described herein may generate for display, on a local display device (e.g., user device 422 and 424 (FIG. 4) described below), a user interface for a model validation platform. The model validation platform may provide comprehensive risk assessments.

User interface 100 may comprise a user interface for a model validation platform. In some embodiments, model validation platform may include a model validation platform that integrates multiple other model validation platforms (e.g., a model development control system). Through user interface 100, the model validation platform, may receive a user request to access a model validation assessment (e.g., as shown in user interface 100 (FIG. 1) below) and/or perform one or more operations (e.g., operations 108) such as selecting models for validation and/or applying parameters to the validation (e.g., setting independent variables, uploading models, and/or selecting output settings).

For example, user interface 100 may allow a user to select one or more model attributes (e.g., model attributes 106) for applying to an inputted model. Model attributes may include any characteristic of a model. These characteristics may comprise a type of data used, an algorithm used, data preparation and/or selection steps and/or any other characteristic of one model that distinguishes it from another. For example, as shown in FIG. 1, a user may select a type of model outcome analysis (e.g., whether or not one is performed by a goodness of fit or residual analysis), options for receiving alternative modeling suggestions, an option to view sensitivity and/or stress test results (e.g., indicating how the uncertainty in the output of a mathematical model or system (numerical or otherwise) can be divided and allocated to different sources of uncertainty in its inputs), and/or receive recommendations on model assessment.

User interface 100 may generate for display data related to a model validation platform. For example, the system may store native data corresponding to fields of the model validation platform. The native data may include data related to one or more tasks or task branches in a hierarchy of tasks that comprises a first model of the model validation platform. For example, the first model may comprise a series of steps that the model validation platform iterates through to test the validating of any inputted model. The series of steps may include one or more tasks (e.g., specific operations, functions, etc.) applied while testing an inputted model. The first hierarchy may also have task branches. As the first model iterates through its tasks, it may determine to follow one task branch over another. For example, each task branch may correspond to a particular type of inputted model, a particular model attribute of an inputted model, data inputs of an inputted model, etc. The task branches for the hierarchy may be comprehensive for any type of inputted model that is detected. For example, the task branches may have branches devoted to every type of model. Then, for each model attribute, data input, etc., the system iteratives along specific branches (or sub-branches) corresponding to each model attribute, data input, etc. corresponding to an inputted model. Through this structure, the model validation platform may receive different types of models and provide validations therefor.

User interface 100 may also include native data for a plurality of models. Native data or native data-formats may comprise data that originates from and/or relates to a respective model, the model validation platform, and/or their respective plugins. In some embodiments, native data may include data resulting from native code, which is code written specifically for a given model, the model validation platform, a respective plugin designed therefor. For example, as shown in user interface 100, the system may generate a graph (e.g., graph 102), which may comprise native data. In some embodiments, native data for multiple models may be displayed simultaneously (e.g., in a side-by-side comparison).

For example, the system may generate a benchmark model based on the native code and/or dataset of one or more models. The system may then compare the benchmark model to the one or more plurality of models. For example, the benchmark model may comprise a model generated by the system based on the native code and/or dataset of one or more models of the previously validated models. For example, the native code and/or dataset of one or more models may comprise the data set upon which the other models were trained, tested, and/or validated). For example, the benchmark models may also share one or more model attributes with the one or more models of the previously validated models. However, the benchmark model may also include different model attributes. For example, the benchmark model may include a model attribute (e.g., a specific data preparation, algorithm, architecture, etc.) that differs from the one or more models of the previously validated models. Based on these differences, the benchmark model may generate different results from the originally validated model. These differences may then be compared (e.g., as described in FIGS. 1-3).

In some embodiments, as shown in FIG. 2, native data may include source code for a model. For example, in some embodiments, the system may allow a user to update and/or edit the source code for an inputted model. For example, the system may receive (e.g., via user interface 200) a user edit to the source code for an inputted model and then store the edited source code for an inputted model. The system may then generate for display the inputted model (or native data for the inputted model) based on the edited source code. For example, the system may allow users having a given authorization to edit source code subject to that authorization. In such cases, the source code may have read/write privileges. Upon generating the source code for display, the system may verify that a current user has one or more read/write privileges. Upon verifying the level of privileges, the system may grant the user access to edit the source code.

User interface 100 may also include assessment data. Assessment data may be presented in any format and/or representation of data that can be naturally read by humans. In some embodiments, the assessment data may appear as a graphical representation of data (e.g., graph 102). For example, the assessment data may comprise a graph of the model validation assessment and/or a level of performance of a model. In such cases, generating the graph may comprise determining a plurality of model validation assessments for different models and graphically representing a relationship of the plurality of model validation assessments. In some embodiments, the relationship of the native data to the model validation assessment may comprise a graphical display describing a hierarchal relationship of the first hierarchy of tasks and the second hierarchy of tasks. For example, the model validation platform may indicate differences and/or provide recommendations for adjustments to an input model as shown in FIG. 3.

Figure 3:
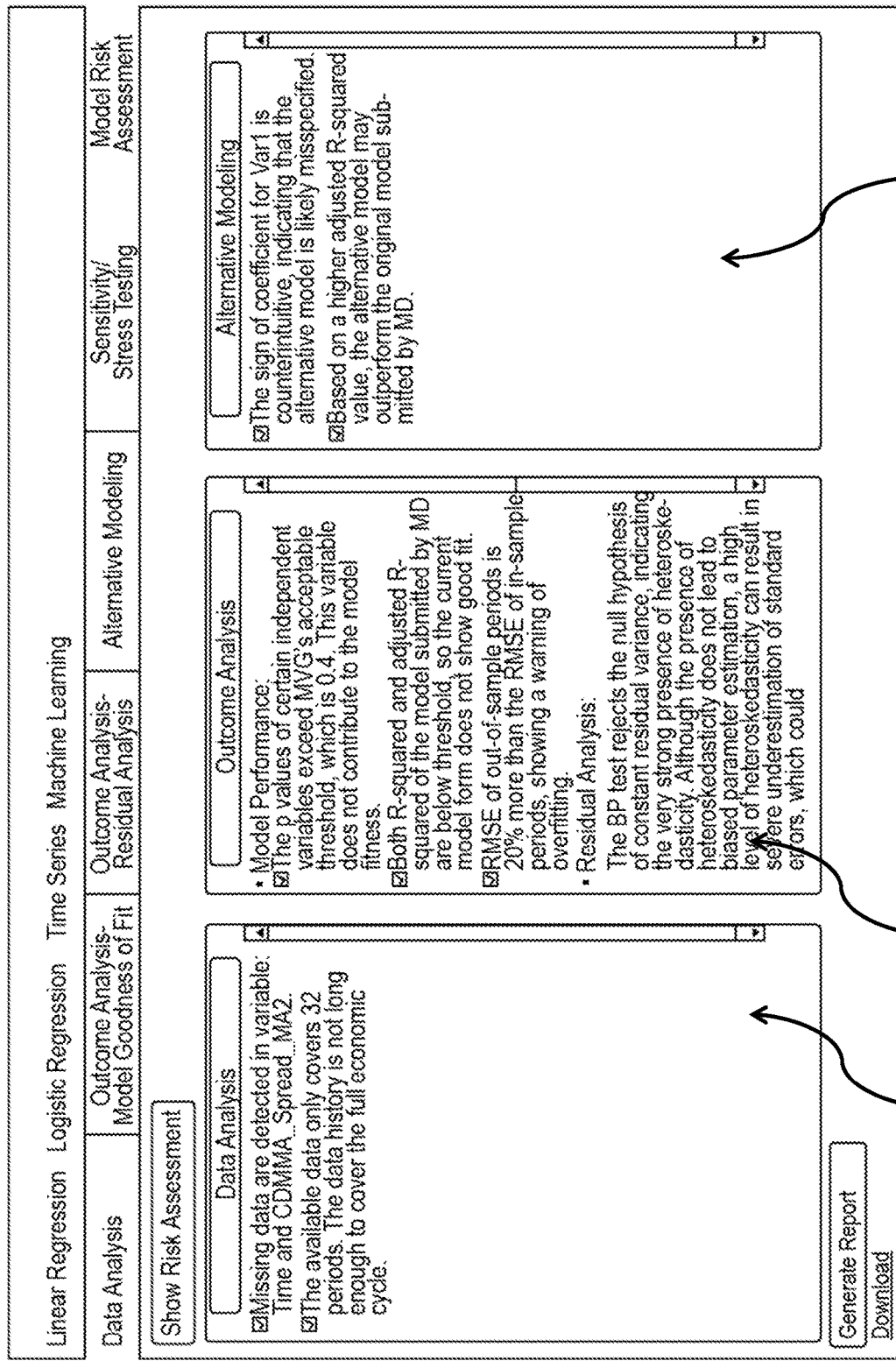
FIG. 3 shows another illustrative user interface for a model validation platform, in accordance with one or more embodiments.

FIG. 3 shows another illustrative user interface for a model validation platform, in accordance with one or more embodiments. For example, the system and methods described herein may generate for display, on a local display device (e.g., user device 422 and 424 (FIG. 4) described below), a user interface for a model validation platform. User interface 300 may comprise a user interface for a model validation platform. Through user interface 300, the model validation platform may receive a user request to access results of a comparison of models such as assessment data and/or perform one or more operations. For example, user interface 300 may provide a collection of model risks identified in various categories, assess model risks involved, and make issue recommendations (e.g., by iterating through the first hierarchy).

For example, user interface 300 shows data analysis 302 which may include indications of potential issues in the inputted model (e.g., as determining by the model validation platform when the second model is inputted into the first model). For example data analysis 302 may include various data quality checks for all raw data inputs and different plot views (e.g., native data) and present them for review. The system may also identify missing information in the inputs and use algorithms to apply appropriate data treatment. Additionally or alternatively, the system may allow code review and code execution functions (e.g., as shown in FIG. 2).

User interface 300 may also include an outcome analysis, which may include a description of the performance level of the second model. For example, the performance level may indicate how well an inputted model performed based on the analysis by the first model. This may include recommendations for changes and adjustments. For example, based on different model types and data inputs, the system may intelligently (e.g., by iterating through the first hierarchy) choose appropriate outcome analyses, such as Model Goodness of Fit and Residual Analysis. The system may also provide information on how a model performs in various sensitivity and stress scenarios.

Additionally, user interface 300 may include suggested alternative model techniques. For example, the model validation platform may determine that an improvement to a model may be achieved through changes to the model (or the use of a different model). For example, based on different model types and data inputs, the system may intelligently (e.g., by iterating through the first hierarchy) generate different alternative models and make model form recommendations. The system may apply standard statistical model forms as well as machine learning models (e.g., as discussed in FIG. 4) in alternative modeling.

The model validation platform may include a model validation assessment. The model validation assessment (e.g., user interface 300) may define a hierarchy of tasks for the model validation platform. For example, a model validation assessment as shown in user interface 300 may comprise a plurality of types of data models or data models. One such data model is a hierarchical database model. A hierarchical database model may comprise a data model in which the data is organized into a tree-like model. The data may be stored as records which are connected to one another through links. A record is a collection of fields, with each field containing only one value. The type of a record defines which fields the record contains. For example, in the hierarchical database model each child record has only one parent, whereas each parent record can have one or more child records.

Figure 4:
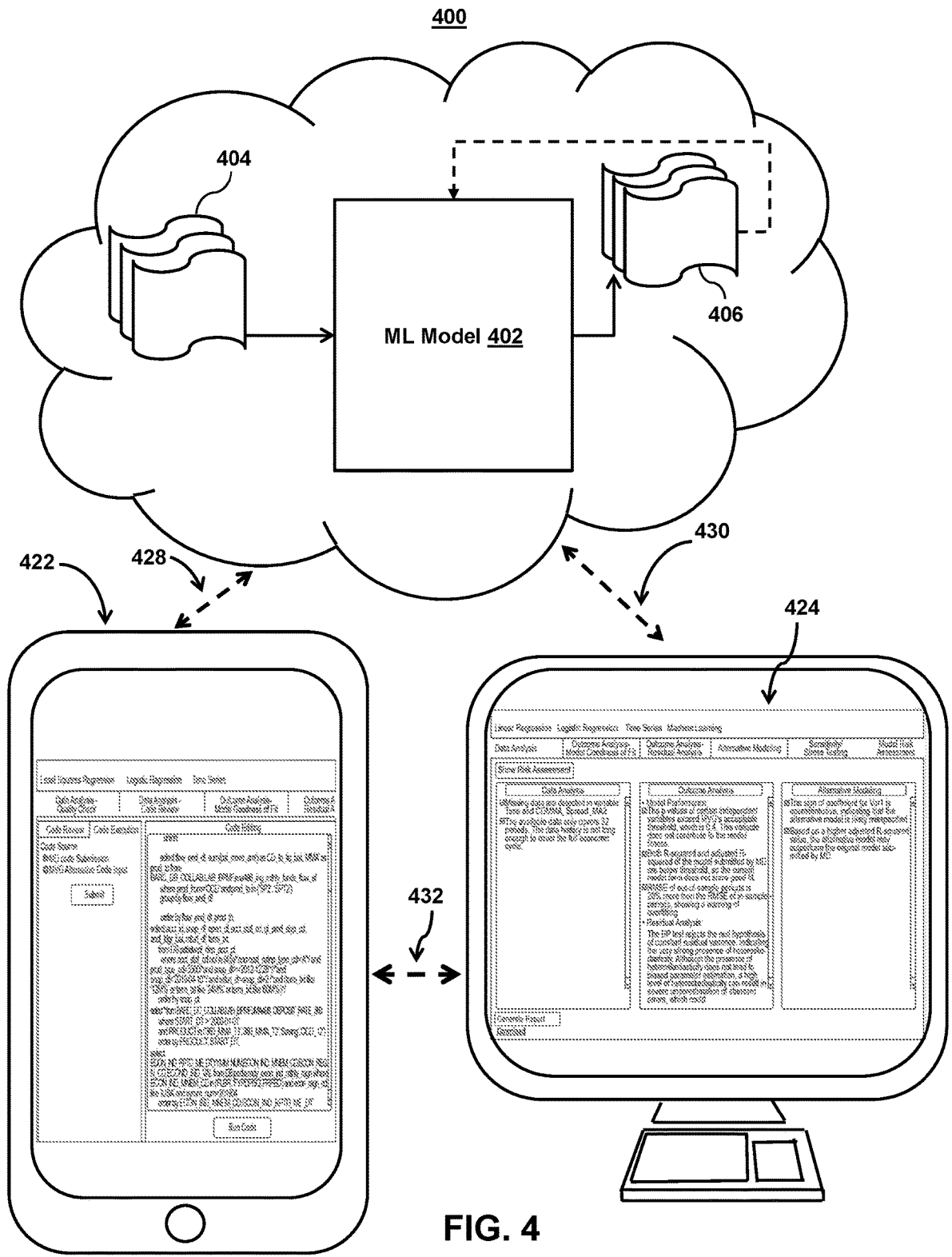
FIG. 4 shows an illustrative system for integrating model development control systems and model validation platforms, in accordance with one or more embodiments.

FIG. 4 shows an illustrative system for integrating model development control systems and model validation platforms, in accordance with one or more embodiments. As shown in FIG. 4, system 400 may include user device 422, user device 424, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 422 and user device 424 may include a desktop computer, a server, or other client device. Users may, for instance, utilize one or more of the user devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of user device 422, those operations may, in some embodiments, be performed by components of user device 424. System 400 also includes machine learning model 402, which may be implemented on user device 422 and user device 424, or accessible by communication paths 428 and 430, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

For example, one or more of the components of system 400 may include cloud-based components (e.g., cloud-based memory, cloud-based control circuitry, cloud-based I/O circuitry, etc.). For example, cloud-based memory may be configured to: store a first model for a model validation platform, wherein the first model defines a first hierarchy of tasks for validating inputted models; and store a second model that has been independently validated, wherein the second model defines a second hierarchy of tasks for simulating scenarios based on a second model data input and a second model attribute. Cloud-based control circuitry may be configured to: receive a user request to perform a model validation assessment using a model validation platform and receive a user selection of the model validation assessment. Cloud-based I/O circuitry may be configured to generate for display, on a local display device, native data for the first model and the second model and assessment data that describes, in a human-readable format, a relationship between the native data for the first model and the second model.

FIG. 4 also includes communication paths 428, 430, and 432. Communication paths 428, 430 and 432 may include the Internet, a mobile phone network, a mobile voice or data network (e.g., a 4G or LTE network), a cable network, a public switched telephone network, or other types of communications network or combinations of communications networks. Communication paths 428, 430 and 432 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 4, machine learning model 402 may take inputs 404 and provide outputs 406. The inputs may include multiple data sets such as a training data set and a test data set. Each of the plurality of data sets (e.g., inputs 404) may include data subsets with common characteristics. The common characteristics may include characteristics about data, model attributes, a model, a model validation assessment, a task and/or hierarchy. In some embodiments, outputs 406 may be fed back to machine learning model 402 as input to train machine learning model 402 (e.g., alone or in conjunction with user indications of the accuracy of outputs 406, labels associated with the inputs, or with other reference feedback information). In another embodiment, machine learning model 402 may update its configurations (e.g., weights, biases, or other parameters) based on the assessment of its prediction (e.g., outputs 406) and reference feedback information (e.g., user indication of accuracy, reference labels, or other information). In another embodiment, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

For example, in some embodiments, machine learning model 402 may be trained to generate a model validation assessment. For example, machine learning model 402 may be trained to determine a first model attribute to be applied to a second model that has been independently validated. In another example, machine learning model 402 may be trained to determine a task branch for automatically generating the model validation assessment based on the second model data input and the second model attribute and/or generate a model validation assessment based on the task branch, wherein the model validation assessment indicates a performance level of the second model In some embodiments, machine learning model 402 may include an artificial neural network. In such embodiments, machine learning model 402 may include input layer and one or more hidden layers. Each neural unit of machine learning model 402 may be connected with many other neural units of machine learning model 402. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 402 may be self-learning and trained, rather than explicitly programmed, and can perform significantly better in certain areas of problem solving, compared to traditional computer programs. During training, an output layer of machine learning model 402 may correspond to a classification of machine learning model 402, and an input known to correspond to that classification may be input into an input layer of machine learning model 402 during training. During testing, an input without a known classification may be input into the input layer, and a determined classification may be output.

In some embodiments, machine learning model 402 may include multiple layers (e.g., where a signal path traverses from front layers to back layers). In some embodiments, back propagation techniques may be utilized by machine learning model 402 where forward stimulation is used to reset weights on the "front" neural units. In some embodiments, stimulation and inhibition for machine learning model 402 may be more free flowing, with connections interacting in a more chaotic and complex fashion. During testing, an output layer of machine learning model 402 may indicate whether or not a given input corresponds to a classification of machine learning model 402 (e.g., determine a task branch of the first model to apply to a second model).

Figure 5:
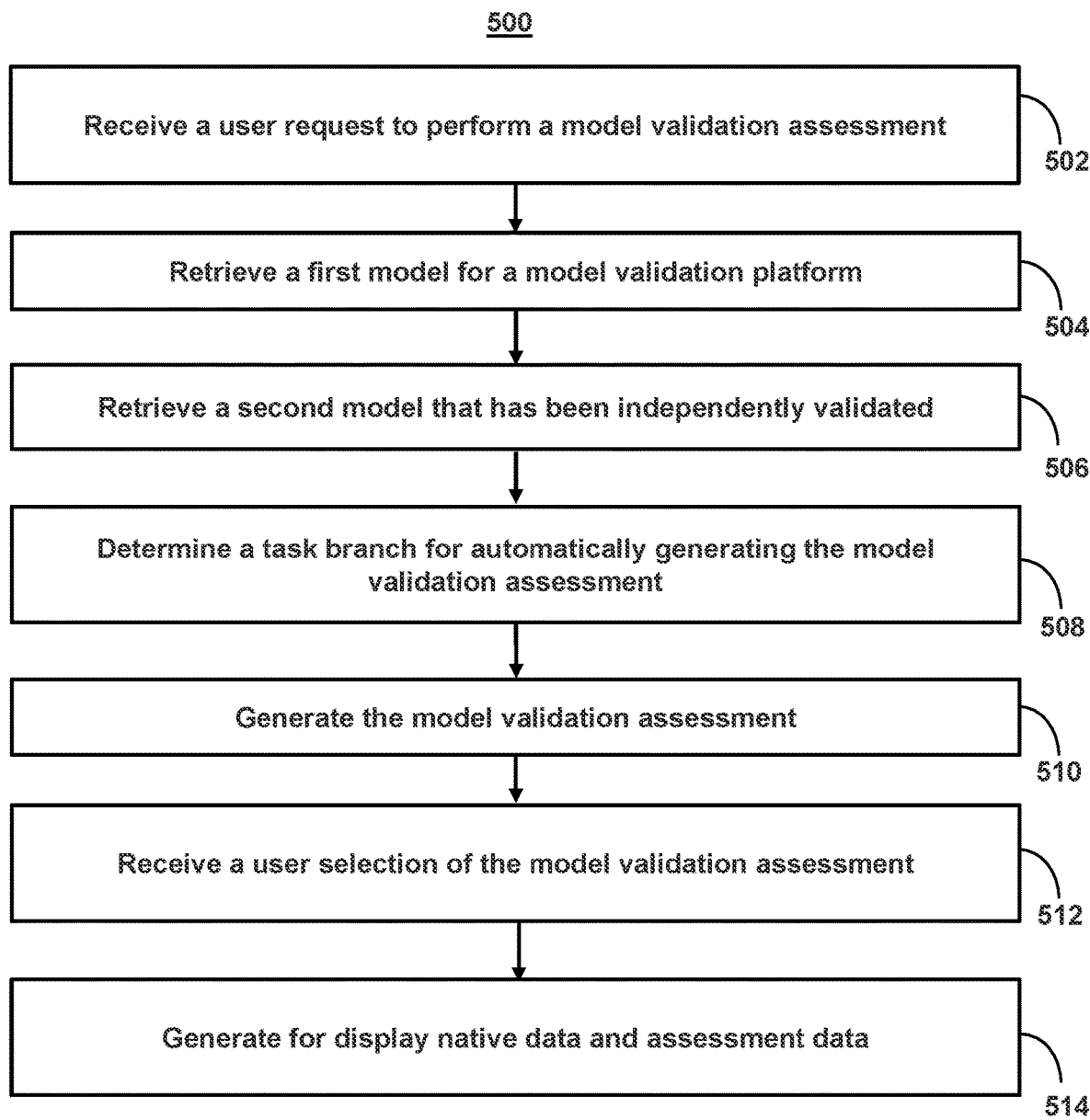
FIG. 5 shows a flowchart of the steps involved in generating native data and assessment data in a model validation platform.
Figure 6:
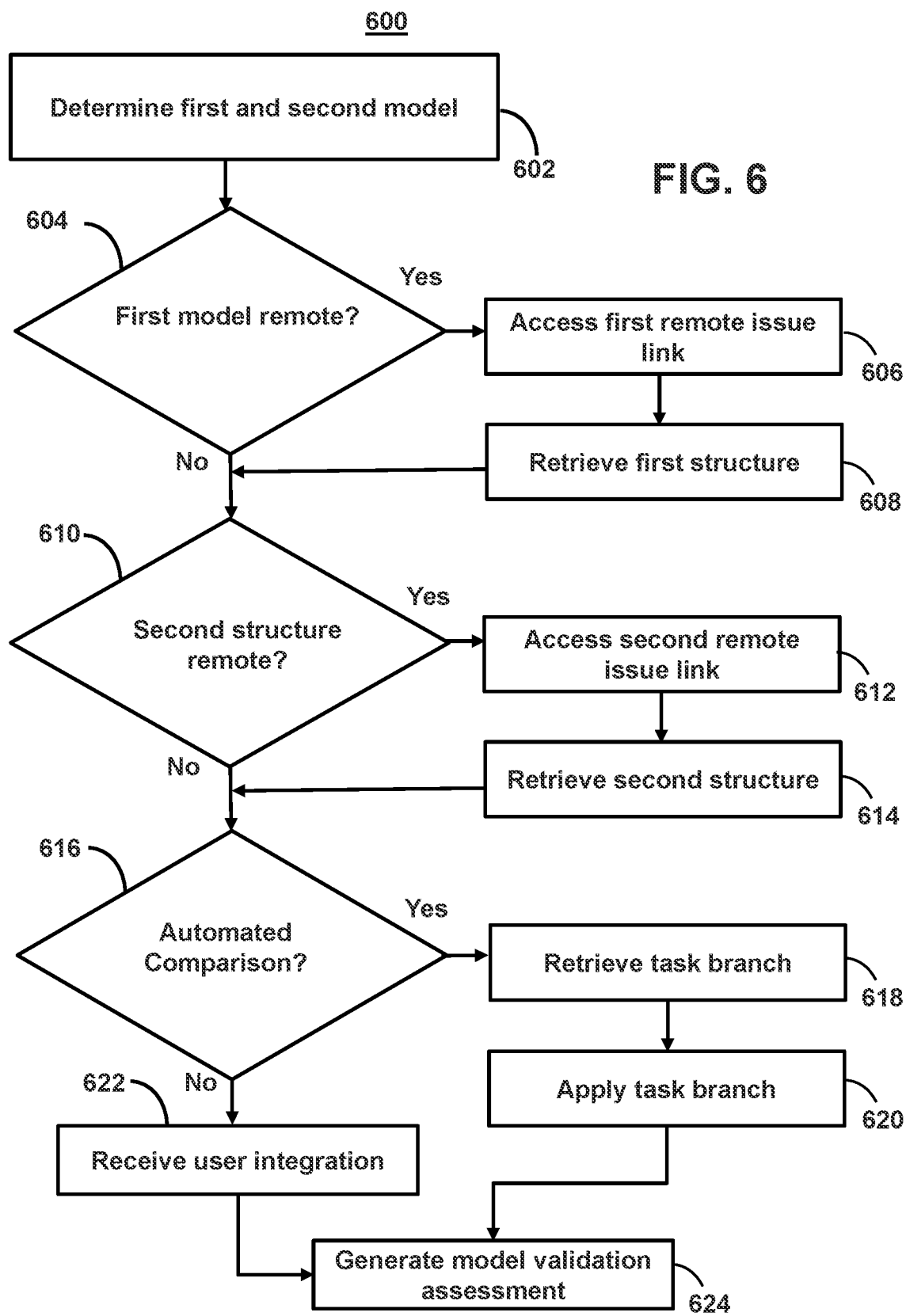
FIG. 6 shows a flowchart of the steps involved in generating a model validation assessment in a model validation platform, in accordance with one or more embodiments.

FIG. 5 shows a flowchart of the steps involved in integrating model development control systems and model validation platforms. For example, process 500 may represent the steps taken by one or more devices as shown in FIG. 4 when integrating model development control systems and model validation platforms. In some embodiments, process 500 may be combined with one or more steps of process 600 (FIG. 6). For example, process 500 may relate to a model validation platform that may store native data corresponding to fields of model development control systems and assessment data (e.g., viewable through a user interface (e.g., user interface 100 (FIG. 1))).

At step 502, process 500 receives (e.g., using control circuitry of one or more components of system 400 (FIG. 4)) a user request to perform a model validation assessment. For example, the system may receive (e.g., via a user interface 100 (FIG. 1)) a user request to perform a model validation assessment using a model validation platform. For example, the system may receive a user query to view information about the progress of a task in a project related to the model validation platform. For example, the system may receive a user query for the model validation platform, determine that a response to the user query is based on a task in a first hierarchy, retrieve native task data for the task, and generate for display the response based on the native task data.

At step 504, process 500 retrieves (e.g., using control circuitry of one or more components of system 400 (FIG. 4)) a first model for a model validation platform. For example, the system may retrieve a first model for a model validation platform, wherein the first model defines a first hierarchy of tasks for validating inputted models. In some embodiments, the first data model may comprise a data organization, management, and storage format that enables efficient access and modification for the model development control system. For example, the first data model may include a collection of data values, data fields, the relationships among them, and the functions or operations that can be applied to the data.

At step 506, process 500 retrieves (e.g., using control circuitry of one or more components of system 400 (FIG. 4)) a second model that has been independently validated. For example, the system may retrieve a second model that has been independently validated, wherein the second model defines a second hierarchy of tasks for simulating scenarios based on a second model data input and a second model attribute. In some embodiments, the second data model may comprise a data organization, management, and storage format that enables efficient access and modification that has been independently validated. For example, the second data model may include a collection of data values, data fields, the relationships among them, and the functions or operations that can be applied to the data.

At step 508, process 500 determines (e.g., using control circuitry of one or more components of system 400 (FIG. 4)) a task branch for automatically generating the model validation assessment. For example, the system may determine a task branch of the first hierarchy of tasks for automatically generating the model validation assessment based on the second model data input and the second model attribute. In some embodiments, generating the model validation assessment based on the first model and the second model may comprise retrieving a task branch of the first model for generating the model validation assessment. For example, the first model may include a hierarchy of tasks for validating a previously validated model. The system may select the task branch for use in providing the assessment data below. In some embodiments, the task branch comprises selecting a model attribute (e.g., model attribute 106 (FIG. 1)) for determining the performance level.

In some embodiments, the model validation assessment may comprise a benchmark model based on the dataset of the second model. The model validation assessment may then compare the benchmark model and the second model (e.g., as discussed in FIGS. 1-3). For example, the benchmark model may comprise a model generated by the system based on the second model data input. The second data input may comprise the data set upon which the second model was trained, tested, and/or validated. The benchmark model may also share one or more model attributes with the second model. However, the benchmark model may also include different model attributes as a result of the task branch that is followed. For example, the benchmark model may include a model attribute (e.g., a specific data preparation, algorithm, architecture, etc.) that differs from the second model.

The model validation assessment may then generate the benchmark model with the one or more different attributes. The different attributes may then result in a different performance level, plot view, etc. The differences between the models may then be compared (e.g., as described in FIGS. 1-3).

At step 510, process 500 generates (e.g., using control circuitry of one or more components of system 400 (FIG. 4)) the model validation assessment based on the first model and the second model. For example, the system may generate the model validation assessment based on the first model and the second model, wherein the model validation assessment indicates a performance level of the second model. For example, the system may receive (e.g., via user interface 100 (FIG. 1)), a user selection of the model validation assessment. Each model validation assessment may contain native data and also may link to other models. For example, the model validation assessment may be represented by a non-linear or linear data model of nodes and edges.

In some embodiments, the performance level may indicate an amount of risk in a model. For example, the performance level may indicate a level of uncertainty that the outputs of a statistical model are acceptable with respect to the real data-generating process. That is, the level of performance may indicate the level of uncertainty that the outputs of a statistical model have enough fidelity to the outputs of the data-generating process that the objectives of the model may be achieved. For example, the task branch may comprise applying the second model to a sensitivity or stress analysis, and the performance level may be based on the sensitivity or stress analysis.

At step 512, process 500 receives (e.g., using control circuitry of one or more components of system 400 (FIG. 4))

a user selection of the model validation assessment. For example, the system may receive (e.g., via user interface 100 (FIG. 1)), a user selection of the model validation assessment. For example, the system may receive (e.g., via user interface 100 (FIG. 1)) a user selection of a model attribute. For example, a model attribute may be selected from several model attributes (e.g., model attributes 106 (FIG. 1)). Each model attribute may be a basic unit of a data model, such as a link between one or more models. Each model validation assessment may contain data and may also link to other nodes. For example, the model validation assessment may be represented by a non-linear data model of nodes and edges. In some embodiments, the system may implement links between nodes through pointers.

At step 514, process 500 generates (e.g., using control circuitry of one or more components of system 400 (FIG. 4)) for display native data and assessment data. For example, the system may generate for display (e.g., on user interface 100 (FIG. 1)), native data, for the first model and the second model, and assessment data that describes, in a human-readable format, a relationship between the native data for the first model and the second model in response to the user selection of the model validation assessment.

For example, native data may comprise native data values or native data-formats and may further comprise data that originates from and/or relates to a respective model, the model validation platforms, a respective plugin designed therefor. In some embodiments, native data may include data resulting from native code, which is code written specifically for the model development control system, the model, the model validation platforms, and/or a respective plugin designed therefor. For example, the native data for the first model and the second model may comprise respective raw data inputs and plot views.

For example, the assessment data may be presented in any format and/or representation of data that can be naturally read by humans (e.g., via a user interface such as user interface 100 (FIG. 1)). In some embodiments, the assessment data may appear as a graphical representation of data. For example, the assessment data may comprise a graph (e.g., 102 (FIG. 1) or chart 104 (FIG. 1)) of the model validation assessment. In such cases, generating the graph may comprise determining a plurality of models (e.g., via model attributes 106 (FIG. 1)) for generating the model validation assessment and graphically representing a relationship of the plurality of models (e.g., as shown in FIG. 1). In some embodiments, the relationship of the native data to the model validation assessment may comprise a graphical display describing a relationship of a result of a model following a first hierarchy of tasks and a previously validated model that follows a second hierarchy of tasks (e.g., as shown in FIGS. 1 and 3).

In some embodiments, the assessment data further comprises a recommendation for an adjustment to the second hierarchy of tasks. For example, as shown in FIG. 3, the system may recommend one or more adjustments to the second model (e.g., the second hierarchy of tasks comprising the second model) in order to reduce risk in the model. For example, the system may generate a recommendation for an adjustment to the second model data input or the second model attribute. For example, the system may generate a recommendation of an alternative modeling technique (e.g., a different model attribute) for use in the second model (e.g., as shown in recommendation 306 (FIG. 3)). Additionally or alternatively, the assessment data may further comprise an effect of the relationship on the performance level of the second model. For example, the system may generate a model attribute that describes an effect of the current model (e.g., as shown in analysis 304 (FIG. 3)).

In some embodiments, the system may allow a user to update and/or edit the assessment data. For example, the system may receive a user edit to the assessment data and then store the edited assessment data. The system may then generate for display the edited assessment data subsequently. For example, the system may allow users having a given authorization to edit assessment data subject to that authorization. In such cases, the assessment data may have read/write privileges. Upon generating the assessment data for display, the system may verify that a current user has one or more read/write privileges. Upon verifying the level of privileges, the system may grant the user access to edit the assessment data.

In some embodiments, the relationship of the native data to the model validation assessment comprises a graphical display describing an application of the first hierarchy of tasks to the second hierarchy of tasks. For example, as shown in user interface 100 (FIG. 1)), the system may generate a graph (e.g., graph 102 (FIG. 1)) indicating a difference when using a first model and a second model.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 5.

FIG. 6 shows a flowchart of the steps involved in generating a model validation assessment in a model validation platform, in accordance with one or more embodiments. For example, process 600 may represent the steps taken by one or more devices as shown in FIGS. 1-4. In some embodiments, process 600 may be combined with one or more steps of process 500 (FIG. 5)).

At step 602, process 600 determines (e.g., using control circuitry of one or more components of system 400 (FIG. 4)) that the model validation assessment comprises a comparison of a first model and the second model. For example, in response to a user query (e.g., via user interface 100 (FIG. 1)) to access a model validation assessment for a model validation platform, the system may determine the one or more models needed for comparison. To determines these, the system may input the user query into a database listing available models (and/or model attributes and/or data types related to the models). The system may filter the available models to determine one or more models that may be provide the model validation assessment.

At step 604, process 600 determines (e.g., using control circuitry of one or more components of system 400 (FIG. 4)) whether or not the first model is located remotely. For example, if the system contains multiple project management servers, models and data related to a single server. In some embodiments, the system may read in and build a merged hierarchy (e.g., a cross-server hierarchy) from remote issue links. This merged hierarchy may comprise a comparison and/or integration of multiple models for use in generating the model validation assessment. If process 600 determines that the first model is located remotely, process 600 proceeds to step 606. If process 600 determines that the first model is not located remotely, process 600 proceeds to step 610.

At step 606, process 600 accesses (e.g., using control circuitry of one or more components of system 400 (FIG. 4)) a first remote issue link. For example, the first remote issue link may be an identifier that uniquely identifies a remote application and/or a remote object within a remote system housing the first model.

At step 608, process 600 retrieves (e.g., using control circuitry of one or more components of system 400 (FIG. 4)) the first model. For example, in response to receiving the user request to access the model validation assessment, the system may determine that the model validation assessment comprises the first model. In response to determining that the model validation assessment comprises the first model, the system may access the first remote issue link to a first server housing the first model. Through the first remote issue link, the system may retrieve (e.g., download, stream, and/or otherwise access through one or more API or database functions) the first model.

At step 610, process 600 determines (e.g., using control circuitry of one or more components of system 400 (FIG. 4)) whether or not the second model is located remotely. For example, similar to the first model, the system may determine if the second model is available locally or remotely. If process 600 determines that the second model is located remotely, process 600 proceeds to step 612. If process 600 determines that the second model is not located remotely, process 600 proceeds to step 616.

At step 612, process 600 accesses (e.g., using control circuitry of one or more components of system 400 (FIG. 4)) a second remote issue link. For example, the second remote issue link may be an identifier that uniquely identifies a second remote application and/or a second remote object within a second remote system housing the second model. It should be noted that in some embodiments, the first and second models may be located in the same remote server. Furthermore, in some embodiments, the remote server may be a component of system 400 (FIG. 4).

At step 614, process 600 retrieves (e.g., using control circuitry of one or more components of system 400 (FIG. 4)) the second model. For example, in response to receiving the user request to access the model validation assessment, the system may determine that the model validation assessment comprises the second model. In response to determining that the model validation assessment comprises the second model, the system may access the second remote issue link to a second server housing the second model. Through the second remote issue link, the system may retrieve (e.g., download, stream, and/or otherwise access through one or more API or database functions) the second model.

At step 616, process 600 determines (e.g., using control circuitry of one or more components of system 400 (FIG. 4)) whether or not the first and second model are automatically compared to generate the model validation assessment. For example, in some embodiments, model automation may be used to reduce manual effort maintaining items and running model assessments. In such cases, the system may retrieve rules and/or determine task branches in hierarchies of tasks supported by model validation platform (or model plugins). Exemplary tasks may include pull requests for model data inputs and the model attributes (e.g., which may pull algorithms and data sets specific to a determine model) and "Add sub-tasks" (e.g., which may pull in all subtasks and/or automatically execute subtasks for a model). If process 600 determines that the first and second model are automatically compared to generate the model validation assessment, process 600 proceeds to step 618. If process 600 determines that the first and second models are not automatically compared to generate the model validation assessment, process 600 proceeds to step 622.

At step 618, process 600 retrieves (e.g., using control circuitry of one or more components of system 400 (FIG. 4)) a task branch. In some embodiments, the system may retrieve a standard task branch. Alternatively, the system may retrieve a custom task branch. For example, the system may select a task branch from a plurality of available task branches based on a type of one or more models. For example, the system may determine a first model attribute for the model validation assessment. The system may then determine a second model attribute that has been independently validated. The system may then determine a task branch for automatically generating the model validation assessment based on the second model data input and the second model attribute. For example, using the data inputs and model attributes, the system may re-validate the second model using the hierarchy of tasks in the first model.

At step 620, process 600 applies (e.g., using control circuitry of one or more components of system 400 (FIG. 4)) a task branch. For example, the system may automatically generate the model validation assessment based on applying the task branch selected in step 618.

At step 622, process 600 receives (e.g., using control circuitry of one or more components of system 400 (FIG. 4)) user integration. For example, the system may receive user inputs (e.g., via user interface 100 (FIG. 1)) selecting a specific tasks (e.g., algorithm, comparison approach, etc.) that are used by the first model (e.g., model attributes 106 (FIG. 1). Alternatively or additionally, the system may receive user inputs selecting a task branch for comparing one or more models and/or one or more portions of a model.

At step 624, process 600 generates (e.g., using control circuitry of one or more components of system 400 (FIG. 4)) a model validation assessment. For example, the system may generate for display the model validation assessment in a user interface (e.g., user interface 300 (FIG. 3)). In some embodiments, generating the model validation assessment may be an iterative process. For example, the system may generate a model graph (e.g., graph 102 (FIG. 1)) for the model validation assessment. The system may then determine model validation assessments (e.g., between the first and second model) based on the task branch selected in step 618 or based on the manual integration performed by a user in step 622.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one of more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for integrating model development control systems and model validation platforms, comprising: receiving, via a user interface, a user request to perform a model validation assessment using a model validation platform; retrieving, using control circuitry, a first model for a model validation platform, wherein the first model defines a first hierarchy of tasks for validating inputted models; retrieving, using the control circuitry, a second model that has been independently validated, wherein the second model defines a second hierarchy of tasks for simulating scenarios based on a second model data input and a second model attribute; determining a task branch of the first hierarchy of tasks for automatically generating the model validation assessment based on the second model data input and the second model attribute; generating, using the control circuitry, the model validation assessment based on the first model and the second model, wherein the model validation assessment indicates a performance level of the second model; receiving, via the user interface, a user selection of the model validation assessment; and in response to the user selection of the model validation assessment, generating for display, on the user interface, native data, for the first model and the second model, and assessment data that describes, in a human-readable format, a relationship between the native data for the first model and the second model.

2. The method of any of the preceding embodiments, wherein the assessment data further comprises a recommendation for an adjustment to the second hierarchy of tasks.

3. The method of any of the preceding embodiments, wherein the assessment data further comprises a recommendation for an adjustment to the second model data input or the second model attribute.

4. The method of any of the preceding embodiments, wherein the assessment data further comprises an effect of the relationship on the performance level of the second model.

6. The method of any of the preceding embodiments, wherein the relationship of the native data to the model validation assessment comprises a graphical display describing an application of the first hierarchy of tasks to the second hierarchy of tasks.

7. The method of any of the preceding embodiments, wherein the task branch comprises selecting a model attribute for determining the performance level.

8. The method of any of the preceding embodiments, wherein the task branch comprises applying the second model to a sensitivity or stress analysis, and the performance level is based on the sensitivity or stress analysis.

9. The method of any of the preceding embodiments, further comprising: in response to receiving the user request, determining that the model validation assessment comprises the second model; and in response to determining that the model validation assessment comprises the second model, accessing: a first remote issue link to a first server housing the first model; and a second remote issue link to a second server housing the first model.

10. The method of any of the preceding embodiments, wherein the native data for the first model and the second model comprises respective raw data inputs and plot views.

11. The method of any of the preceding embodiments, further comprising: receiving a user edit to source code of the second model; and storing the edited source code.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

What is claimed is:

1. A system for integrating model development control systems and model validation platforms, comprising:
    cloud-based memory configured to:
        store a first model for a model validation platform, wherein the first model defines a first hierarchy of tasks for validating inputted models; and
        store a second model that has been independently validated, wherein the second model defines a second hierarchy of tasks for simulating scenarios based on a second model data input and a second model attribute;
    cloud-based control circuitry configured to:
        receive a user request to perform a model validation assessment using a model validation platform;
        determine a task branch of the first hierarchy of tasks for automatically generating the model validation assessment based on the second model data input and the second model attribute; and
    cloud-based I/O circuitry configured to:
        generate for display, on a local display device, the model validation assessment based on the task branch, wherein the model validation assessment indicates a performance level of the second model; and
        generate for display, on the local display device, native data, for the first model and the second model, and assessment data that describes, in a human-readable format, a relationship between the native data for the first model and the second model in response to a user selection of the model validation assessment.

2. A method for integrating model development control systems and model validation platforms, comprising:
    receiving, via a user interface, a user request to perform a model validation assessment using a model validation platform;
    retrieving, using control circuitry, a first model for a model validation platform, wherein the first model defines a first hierarchy of tasks for validating inputted models;
    retrieving, using the control circuitry, a second model that has been independently validated, wherein the second model defines a second hierarchy of tasks for simulating scenarios based on a second model data input and a second model attribute;
    determining a task branch of the first hierarchy of tasks for automatically generating the model validation assessment based on the second model data input and the second model attribute;
    generating, using the control circuitry, the model validation assessment based on the first model and the second model, wherein the model validation assessment indicates a performance level of the second model;
    receiving, via the user interface, a user selection of the model validation assessment; and in response to the user selection of the model validation assessment, generating for display, on the user interface, native data, for the first model and the second model, and assessment data that describes, in a human-readable format, a relationship between the native data for the first model and the second model.

3. The method of claim 2, wherein the assessment data further comprises a recommendation for an adjustment to the second hierarchy of tasks.

4. The method of claim 2, wherein the assessment data further comprises a recommendation for an adjustment to the second model data input or the second model attribute.

5. The method of claim 2, wherein the assessment data further comprises an effect of the relationship on the performance level of the second model.

6. The method of claim 2, wherein the relationship of the native data to the model validation assessment comprises a graphical display describing an application of the first hierarchy of tasks to the second hierarchy of tasks.

7. The method of claim 2, wherein the task branch comprises selecting a model attribute for determining the performance level.

8. The method of claim 2, wherein the task branch comprises applying the second model to a sensitivity or stress analysis, and the performance level is based on the sensitivity or stress analysis.

9. The method of claim 2, further comprising:
in response to receiving the user request, determining that the model validation assessment comprises the second model; and
in response to determining that the model validation assessment comprises the second model, accessing:
a first remote issue link to a first server housing the first model; and
a second remote issue link to a second server housing the first model.

10. The method of claim 2, wherein the native data for the first model and the second model comprises respective raw data inputs and plot views.

11. The method of claim 2, further comprising:
receiving a user edit to source code of the second model; and
storing the edited source code.

12. A non-transitory, computer-readable medium for integrating model development control systems and model validation platforms, comprising instructions that, when executed by one or more processors, cause operations comprising:
receiving, via a user interface, a user request to perform a model validation assessment using a model validation platform;
retrieving a first model for a model validation platform, wherein the first model defines a first hierarchy of tasks for validating inputted models;
retrieving a second model that has been independently validated, wherein the second model defines a second hierarchy of tasks for simulating scenarios based on a second model data input and a second model attribute;
determining a task branch of the first hierarchy of tasks for automatically generating the model validation assessment based on the second model data input and the second model attribute;
generating the model validation assessment based on the first model and the second model, wherein the model validation assessment indicates a performance level of the second model;
receiving, via the user interface, a user selection of the model validation assessment; and
in response to the user selection of the model validation assessment, generating for display, on the user interface, native data, for the first model and the second model, and assessment data that describes, in a human-readable format, a relationship between the native data for the first model and the second model.

13. The non-transitory, computer readable medium of claim 12, wherein the assessment data further comprises a recommendation for an adjustment to the second hierarchy of tasks.

14. The non-transitory, computer readable medium of claim 12, wherein the assessment data further comprises a recommendation for an adjustment to the second model data input or the second model attribute.

15. The non-transitory, computer readable medium of claim 12, wherein the assessment data further comprises an effect of the relationship on the performance level of the second model.

16. The non-transitory, computer readable medium of claim 12, wherein the relationship of the native data to the model validation assessment comprises a graphical display describing an application of the first hierarchy of tasks to the second hierarchy of tasks.

17. The non-transitory, computer readable medium of claim 12, wherein the task branch comprises selecting a model attribute for determining the performance level or applying the second model to a sensitivity or stress analysis, and the performance level is based on the sensitivity or stress analysis.

18. The non-transitory, computer readable medium of claim 12, further comprising:
in response to receiving the user request, determining that the model validation assessment comprises the second model; and
in response to determining that the model validation assessment comprises the second model, accessing:
a first remote issue link to a first server housing the first model; and
a second remote issue link to a second server housing the first model.

19. The non-transitory, computer readable medium of claim 12, wherein the native data for the first model and the second model comprises respective raw data inputs and plot views.

20. The non-transitory, computer readable medium of claim 12, further comprising:
receiving a user edit to source code of the second model; and
storing the edited source code.

* * * * *